March 23, 1954  M. E. McCLELLAN ET AL  2,672,807
FOLDING BALE CASE EXTENSION FOR BALERS
Filed March 29, 1951  2 Sheets-Sheet 1
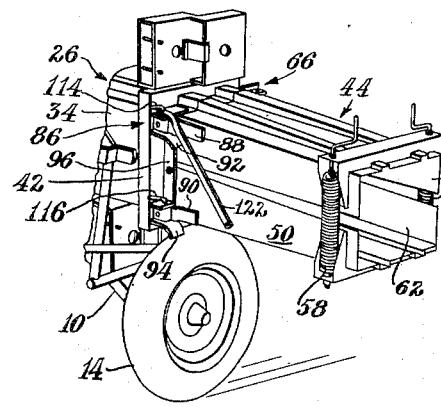
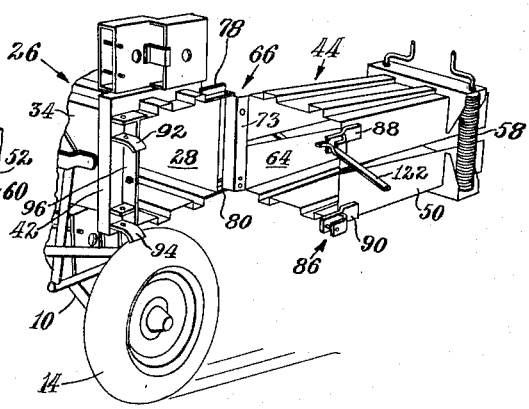
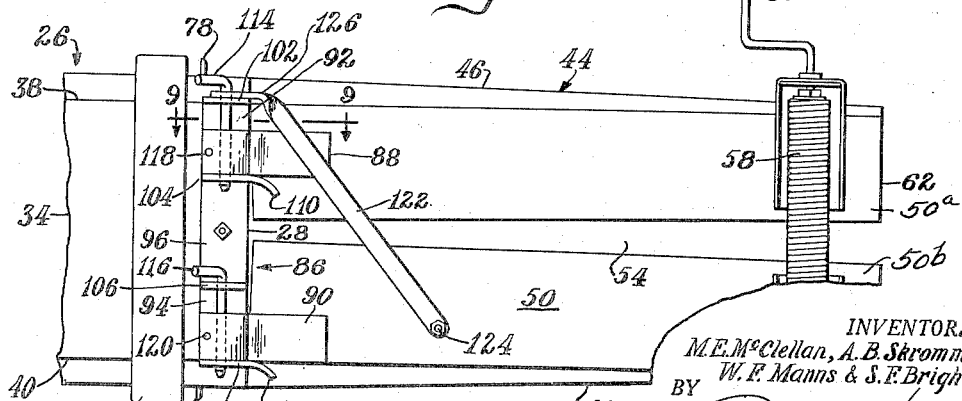
INVENTORS
M.E.McClellan, A.B.Skromme,
W.F.Manns & S.F.Bright
BY
Attorneys March 23, 1954
M. E. McCLELLAN ET AL
2,672,807
FOLDING BALE CASE EXTENSION FOR BALERS
Filed March 29, 1951
2 Sheets-Sheet 2
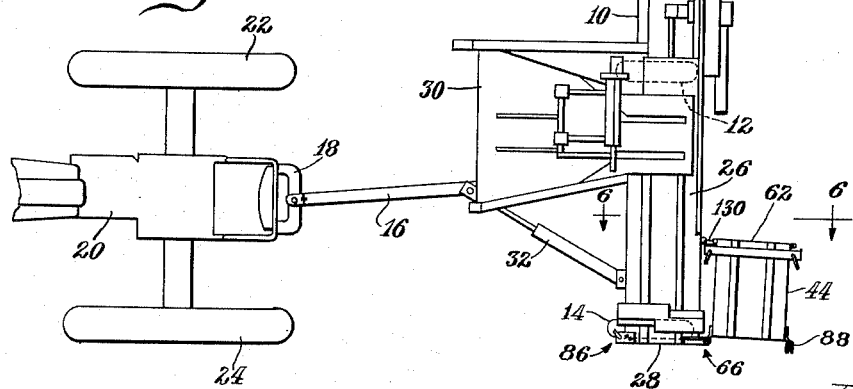
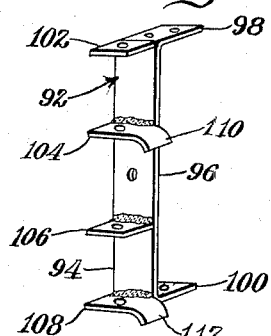
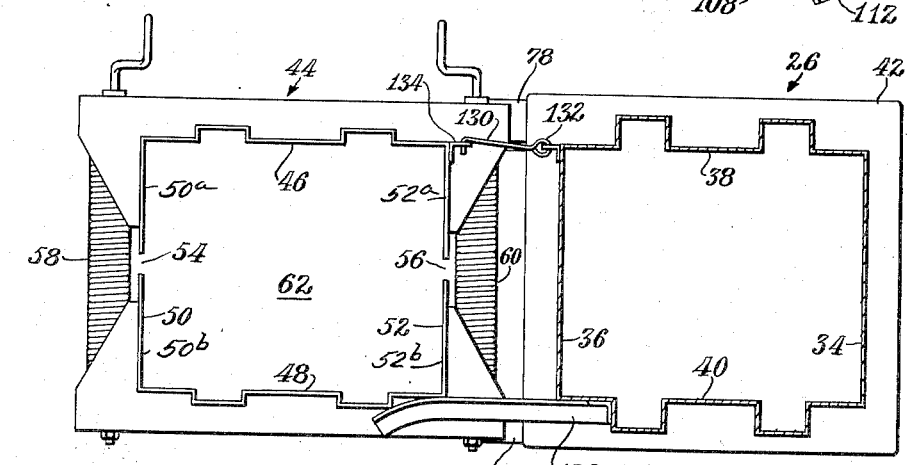
INVENTORS
M.E.McClellan, A.B.Skromme,
W.F.Manns & S.F.Bright
BY
Attorneys Patented Mar. 23, 1954

2,672,807

UNITED STATES PATENT OFFICE 2,672,807

FOLDING BALE CASE EXTENSION FOR BALERS

Marcus E. McClellan and Arnold B. Skromme, Ottumwa, William F. Manns, Albia, and Samuel F. Bright, Ottumwa, Iowa, assignors to Deere Manufacturing Co., Dubuque, Iowa, a corporation of Iowa Application March 29, 1951, Serial No. 218,194

5 Claims. (Cl. 100—100)

This invention relates to an agricultural baler of the type used for baling hay, straw and other material. More particularly, the invention relates to a bale case extension for such baler, the extension being arranged so that it may be swung from a first position in alinement with the baler to a second position in folded relationship to the baler.

The invention finds its greatest utility in connection with balers of the so-called cross-mounted type. In a baler of this character, the baler includes a mobile frame adapted to be drawn forwardly over a field by a tractor or other draft source. The baler has means for picking up windrows of hay or straw and for feeding this material to a baling chamber and bale case that lie transversely to the line of travel. In the conventional baler, the bale case is supplemented by a continuation in the form of a bale case extension and, as the bales are formed and tied, they are successively discharged outwardly through the open end of the bale case extension to fall upon the ground or to be received by appropriate bale-handling means. Because of the addition of the bale case extension, the over-all width of the baler is materially increased and it is difficult, when transporting the baler on roads or highways, to accommodate the width of the baler to surrounding objects designed to provide clearance for conventional vehicles. This problem has heretofore been solved by complete removal of the bale case extension. This, obviously, is hardly a solution when it is considered that the bale case extension is quite heavy, rendering it almost impossible for one man to remove it and replace it.

According to the present invention, the bale case extension is connected to the open or discharge end of the bale case by means including a hinge and releasable latch element, whereby the bale case extension may be swung between a first position in which the extension forms a continuation of the bale case and a second position in which the bale case extension is folded relative to the bale case. It is a further object to provide hinge and latch elements that may be readily incorporated into existing constructions so that change-over from conventional designs may be easily effected by the user. It is a further object to provide a construction that is easy to produce and inexpensive from the standpoint of the purchaser. At the same time, the design is of simple construction and, being unlikely to present any operating difficulties, should have relatively long life.

The foregoing and other important objects and desirable features inherent in and encompassed by the invention will become apparent from the following detailed description and accompanying sheets of drawings in which Figure 1 is a fragmentary perspective view showing the bale case extension in its operating position as a continuation of the bale case;

Figure 2 is a similar view, showing the bale case extension swung rearwardly;

Figure 3 is a rear view, on an enlarged scale, of the bale case extension, illustrating the hinge connection thereof to the bale case;

Figure 4 is a front view of the bale case extension shown in Figure 3;

Figure 5 is a schematic view, on a reduced scale, showing the relationship of a cross-mounted baler to a tractor, the bale case extension being shown in its folded position;

Figure 6 is an enlarged transverse view taken substantially on the line 6—6 of Figure 5;

Figure 7 is a perspective view of one of the mounting brackets including latch means for retaining the bale case in its operating position;

Figure 8 is an enlarged fragmentary sectional view taken on the line 8—8 of Figure 3; and Figure 9 is an enlarged fragmentary sectional view taken on the line 9—9 of Figure 4.

Reference will be had first to Figure 5 for an over-all picture of the baler. In this figure, the baler is shown as comprising a main frame 10 carried on a pair of wheels 12 and 14 for forward travel over the ground by means of a forwardly extending draft tongue 16 adapted to be connected to drawbar structure 18 of any suitable source of draft power, here shown as a typical agricultural tractor 20 having right- and left-hand rear wheels 22 and 24.

The baler includes a bale case 26 disposed transverse to the line of travel and having an outer or open end 28. Ahead of the bale case is a pick-up mechanism 30 which, as is conventional, operates to pick up windrowed hay or straw for the purpose of ultimately feeding this material rearwardly and into the interior or chamber of the bale case 26.

In the relationship shown, the baler is in transport position to trail behind the tractor 20. In this position, the draft tongue 16 is braced relative to the main frame 10 by a releasable brace 32. In operating position, the brace 32 is shortened, with the result that the baler will be sufficiently offset to the righ of the tractor so that the pick-up 30 operates along a windrow to the right of the right-hand tractor rear wheel 22.

The bale case is made up of front and rear walls 34 and 36 and top and bottom walls 38 and 40. These walls are arranged to give the bale case 26 a generally rectangular shape (Figures 2 and 6), and the outer terminal edges of these walls define the bale case opening 28. Just inwardly of the outer opening 28, the bale case is provided with a reenforcing collar 42. This collar is a typical part of the particular baler illustrated but forms no specific part of the present invention.

The bale case extension is designated generally by the numeral 44. This component likewise has a rectangular shape, given to it by top and bottom walls 46 and 48 and front and rear walls 50 and 52. It will be noted (Figure 6) that the walls 50 and 52 are not perfect walls in the sense that the expression is commonly understood, because each wall is divided along a midline, as at 54, 56, so that the front wall has upper and lower halves 50a and 50b and the rear wall has upper and lower halves 52a and 52b; hence, the top and bottom walls 46 and 48 may be controlled by a pair of tension springs 58 and 60. These springs and the relatively movable top and bottom walls 46 and 48 represent a typical form of tensioning means for controlling the size and density of bales passed through the bale case extension. The details of this mechanism form no part of the present invention and the brief description thereof is merely for the purposes of completing the disclosure of the particular structure illustrated.

The outermost terminal edges of the walls 46, 48, 50 and 52 define an outer or bale-discharge opening 62 for the bale case extension. These walls also define an inner opening 64 which, when the bale case extension is in its first position as shown in Figure 1, is coincident with the outer opening 28 of the bale case 26. Therefore, the bale case extension 44 is a continuation of the bale case 26.

The inner terminal edge of the rear wall of the bale case extension is connected to or supported by the rear wall outer edge of the bale case 26 by hinge means designated generally by the numeral 66. This means includes a vertical hinge or pivot pin 68 carried by upper and lower hinge sleeves 70 and 72 rigid on an angle member 73 secured to the lower half 52b of the rear wall 52. In this respect, the expression "wall" should be construed to include the present structure or its equivalent, for it will be obvious that the walls 50 and 52 may be otherwise constructed and may even be spaced apart frame members as is the case in some balers. Because of the nature of the wall sections in the present case, the upper and lower sections or halves 52a and 52b of the rear wall are connected by a diagonal brace 74, the upper connection of which at 76 provides a pivot for the upper section of the bale case extension under control of the springs 58 and 60. A rhomboid shaped plate 77 is pivoted at 76 to the angle 73 and is rigidly secured as by welding to the upper half 52a of the rear wall.

The hinge means 66 further includes upper and lower brackets 78 and 80 secured respectively to the bale case 26 at the outer or terminal edge portion of the rear wall. Specifically, these brackets 78 and 80 are secured to rear portions of the top and bottom walls 38 and 40. These brackets are apertured to receive upper and lower ends of the hinge or pivot pin 68, the pin being retained by cotters 82 and 84.

The bale case extension is maintained in its first or operating position (Figure 1) by releasable retaining means designated generally by the numeral 86. The latch means includes upper and lower latch elements 88 and 90 secured respectively to upper and lower sections of the front wall 50, and upper and lower cooperating latch elements 92 and 94 positioned on a bracket 96 for cooperation respectively with the latch elements 88 and 90. The upper half 50a of the front wall is pivoted to the bracket 96 coaxially with the pivot 76 on the angle 73, but this pivot is concealed by the member 88. The bracket is shown in Figure 7 as comprising an elongated member having at its upper and lower ends inwardly turned apertured ears 98 and 100. The bracket 96 lies along the terminal edge of the front wall 34 of the bale case 26 and the apertured ears 98 and 100 respectively overlie proximate portions of the upper and lower walls 38 and 40 of the bale case 26. The bracket is rigidly attached to the bale case in any suitable manner.

The bracket further includes, as part of the upper latch element 92, a pair of apertured ears 102 and 104 and, as part of the lower latch element 94, a pair of apertured ears 106 and 108. Each of the lower ears 104 and 108 is turned down to provide a ramp, as at 110 for the ear 104 and as at 112 for the ear 108. Thus, when the bale case extension is swung from the position of Figure 2 to that of Figure 1, the ramps receive and guide the bale case extension latch elements 88 and 90 into a position in which releasable means in the form of a pair of retaining pins 114 and 116 may be dropped respectively through the pair of ears 102—104 and 106—108. The upper latch 88 on the bale case extension has a locking member in the form of a pin 118 behind which the locking pin 114 passes. The lower bale case extension latch element 90 is provided with a similar locking member or pin 120.

The particular latching means illustrated is adapted to the particular bale case extension by the utilization of a diagonal brace 122 that is connected at 124 to the lower section of the front wall 50 and that has an upper portion 126 apertured to receive the upper retaining pin 114 when the bale case extension is in its operating position. The brace 122 thus serves the same function as the brace 74.

A further feature of the invention resides in means for receiving and supporting the bale case extension 44 when it is swung to its folded position as shown in Figures 5 and 6. This means here takes the form of a ramp member 128 rigidly affixed to the rear portion of the bale case 26 at a point spaced inwardly from the outer end 28 thereof within the length of the bale case extension 44. The downturned or rearward end of the ramp member 128 thus receives the bale case extension 44 when the extension is swung rearwardly, and the upper flat part of the ramp member serves to support the bale case extension against vertical displacement, thus relieving the load on the hinge means 66.

A still further feature of the invention resides in the releasable means for retaining the bale case extension in its folded position. This means is best shown in Figures 5 and 6 as comprising a hook 130 pivotally connected at 132 to the bale case 26 at a rear portion thereof substantially directly above the ramp member 128. The outermost end portion of the upper section of the rear wall 52 of the bale case extension has thereon an apertured ear 134 into which the hook 130 engages when the bale case extension 44 is folded.

It will be seen from the foregoing description that the bale case extension is conveniently mounted for swinging between the two positions indicated. In both positions, the bale case extension is fully supported by the bale case and the user is relieved from the burden of dismantling the bale case extension for removing it from the bale case. Instead, all that he has to do involves removal of the retaining pins 114 and 116 so that the bale case extension can be swung to the position of Figures 5 and 6, in which position it is releasably retained by the means 130 until such time as it is desired to move it again to its operating position as shown in Figure 1. The particular design illustrated may be readily adapted to existing balers or bale case extensions modified in accordance with the present disclosure may be provided as attachments for existing balers.

Various other desirable features of the invention not specifically enumerated herein will undoubtedly occur to those versed in the art, as likewise will numerous modifications and alterations in the preferred form of the invention illustrated, all of which may be achieved without departing from the spirit and scope of the invention as defined in the appended claims.

What is claimed is:

1. For a mobile baler having a bale case disposed transversely to the line of travel, wherein the bale case includes front and rear and top and bottom walls arranged in generally rectangular form and having outer terminal edges defining an outer open end for the bale case; a bale case extension having front and rear and top and bottom walls arranged in generally rectangular form substantially coincident with the form of the bale case, said bale case extension walls having inner terminal edges defining an inner open end for the bale case extension proximate to and alineable with the open end of the bale case when the bale case extension is positioned as a continuation of the bale case; a hinge member on an upright axis carried by the bale case extension rear wall at its inner terminal edge; upper and lower hinge brackets pivoted on the hinge member and having provision for affixation respectively to the top and bottom walls of the bale case to carry the bale case extension for swinging rearwardly about said upright axis to a folded position alongside the bale case rear wall and inwardly of the open end of the bale case; a first pair of vertically spaced latch elements carried by the bale case extension front wall at the inner terminal edge thereof; a second pair of latch elements detachably connected respectively to the latch elements of said first pair and having provision for affixation to the bale case at its outer open end; and at least one of the latch elements of the first pair and the cooperating one of the latch elements of the second pair having interengageable guide portions to facilitate repositioning of the bale case extension as it is swung from its folded position to its alined position as a continuation of the bale case.

2. For a mobile baler having a bale case disposed transversely to the line of travel, wherein the bale case includes front and rear and top and bottom walls arranged in generally rectangular form and having outer terminal edges defining an outer open end for the bale case; a bale case extension having front and rear and top and bottom walls arranged in generally rectangular form substantially coincident with the form of the bale case, said bale case extension walls having inner terminal edges defining an inner open end for the bale case extension proximate to and alineable with the open end of the bale case when the bale case extension is positioned as a continuation of the bale case; a hinge member on an upright axis carried by the bale case extension rear wall at its inner terminal edge; upper and lower hinge brackets pivoted on the hinge member and having provision for affixation respectively to the top and bottom walls of the bale case to carry the bale case extension for swinging rearwardly about said upright axis to a folded position alongside the bale case rear wall and inwardly of the open end of the bale case; a first pair of vertically spaced latch elements carried by the bale case extension front wall at the inner terminal edge thereof, a second pair of latch elements detachably connected respectively to the latch elements of said first pair and having provision for affixation to the bale case at its outer open end; and ramp means having provision for mounting on the rear wall of the bale case spaced inwardly from the open end thereof to receive and guide the bale case extension into its folded position.

3. For a mobile baler having a bale case disposed transversely to the line of travel, wherein the bale case includes front and rear and top and bottom walls arranged in generally rectangular form and having outer terminal edges defining an outer open end of the bale case; a bale case extension having front and rear and top and bottom walls arranged in generally rectangular form substantially coincident with the form of the bale case, said bale case extension walls having inner terminal edges defining an inner open end for the bale case extension proximate to and alineable with the open end of the bale case when the bale case extension is positioned as a continuation of the bale case; a hinge member on an upright axis carried by the bale case extension rear wall at its inner terminal edge; upper and lower hinge brackets pivoted on the hinge member and having provision for affixation respectively to the top and bottom walls of the bale case to carry the bale case extension for swinging rearwardly about said upright axis to a folded position alongside the bale case rear wall and inwardly of the open end of the bale case; a first pair of vertically spaced latch elements carried by the bale case extension front wall at the inner terminal edge thereof; a second pair of latch elements detachably connected respectively to the latch elements of said first pair and having provision for affixation to the bale case at its outer open end; and releasable means having provision for connection between the bale case extension and the bale case to hold the bale case temporarily in its folded position.

4. A bracket for a bale case to support an extension of the bale case thereon, said bracket comprising a vertical member having upper and lower ends extending outwardly in the same direction and respectively forming upper and lower legs of a U member of which the vertical member is the bight, the legs of the U member respectively having upper and lower attaching means coplanar therewith and extending from said vertical member in a direction opposite to that of said ends, one of said attaching means having a ramp at the end thereof extending outwardly from one edge of the vertical member and downwardly and below said lower end.

5. The invention defined in claim 4, including a pair of vertically spaced elements fixed to and projecting from the vertical member in the same direction as the upper and lower attaching means, said elements being located between said upper and lower attaching means, one element being spaced below the upper attaching means and the other element being spaced above the lower attaching means, and one element having a ramp thereon similar to the ramp on the aforesaid one attaching means.

MARCUS E. McCLELLAN.
  ARNOLD B. SKROMME.
  WILLIAM F. MANNS.
  SAMUEL F. BRIGHT.

References Cited in the file of this patent

UNITED STATES PATENTS

| Number | Name | Date |
|---|---|---|
| 1,636,835 | Rasp | July 26, 1927 |
| 2,484,890 | Hill | Oct. 18, 1949 |